United States Patent [19]

Petitpierre et al.

[11] 4,101,541

[45] Jul. 18, 1978

[54] 3-CYANO-1,2,4-THIADIAZOLYL-5-CZO DYESTUFFS

[75] Inventors: Jean Claude Petitpierre, Kaiseraugst; Visvanathan Ramanathan, Basel, both of Switzerland

[73] Assignee: Ciba-Geigy Corporation, Ardsley, N.Y.

[21] Appl. No.: 729,067

[22] Filed: Oct. 4, 1976

Related U.S. Application Data

[63] Continuation of Ser. No. 532,331, Dec. 12, 1974, abandoned.

[30] Foreign Application Priority Data

Dec. 21, 1973 [CH] Switzerland .................. 18040/73

[51] Int. Cl.$^2$ .................. C09B 29/06; C09B 29/10; C09B 29/24; C09B 29/38
[52] U.S. Cl. .................. 260/158; 260/146 R; 260/146 D; 260/146 T; 260/153; 260/154; 260/155; 260/156; 260/306.8 D
[58] Field of Search .......... 260/146 R, 146 D, 146 T, 260/147, 153, 154, 155, 156, 158

[56] References Cited

U.S. PATENT DOCUMENTS

| 2,771,466 | 11/1956 | Towne et al. | 260/158 |
|---|---|---|---|
| 2,835,661 | 5/1958 | Straley et al. | 260/146 R |
| 3,639,384 | 2/1972 | Weaver et al. | 260/158 X |
| 3,639,385 | 2/1972 | Weaver et al. | 260/158 |
| 3,640,993 | 2/1972 | Hegar | 260/153 X |
| 3,640,995 | 2/1972 | Weaver et al. | 260/158 |
| 3,699,092 | 10/1972 | Weaver et al. | 260/155 |
| 3,732,201 | 5/1973 | Ramanathan | 260/146 R X |
| 3,775,049 | 11/1973 | Wolfrum et al. | 260/158 X |

*Primary Examiner*—Charles F. Warren
*Attorney, Agent, or Firm*—Edward McC. Roberts; Michael W. Glynn; Prabodh I. Almaula

[57] ABSTRACT

Azo dyestuffs, free from sulfo groups, containing a 3-cyano-1,2,4-thiadiazole diazo component are disclosed. These dyestuffs are useful in dyeing and printing synthetic fibers, for example, especially polyester fibers and polypropylene fibers which have been metal modified.

5 Claims, No Drawings

3-CYANO-1,2,4-THIADIAZOLYL-5-CZO DYESTUFFS

This is a continuation of application Ser. No. 532,331, filed on Dec. 12, 1974, now abandoned.

The present invention relates to new, optionally quaternised valuable azo dyestuffs which are free from sulphonic acid groups and which are characterised in that they contain at least one 1,2,4-thiadiazolyl-5-azo group of the formula

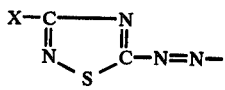

wherein X denotes —CN, —CF$_3$, —CCl$_3$, —CBr$_3$, —CCl$_2$CN or —CCl(CN)$_2$.

These dyestuffs are obtained by coupling compounds, which contain at least one radical of a coupling component, with a diazotised 1,2,4-thiadiazolyl-5-amine which carries the radical X, defined above, in the 3-position, and subsequently optionally quaternising the product.

Preferred dyestuffs are the dyestuffs, free from sulphonic acid groups, of the formula

D—N=N—B    (I)

wherein D is a 1,2,4-thiadiazole or -thiadiazolium radical which carries a trifluoromethyl, tribromomethyl, cyanodichloromethyl or dicyanochloromethyl radical, but preferably a cyano or trichloromethyl radical, in the 3-position, and B is the radical of a coupling component which is bonded direct or via an azophenylene radical, especially a radical of a phenol or naphthol, of a pyrazolone, of a pyridone, of an aminopyrazole, of an enolisable keto compound, of an indole and, above all, of an alkylaniline.

The dyestuffs can be represented by the formula

D—N=N-(A-NR$_1$R$_2$)$_{a-1}$ (B)$_{2-a}$    (II)

wherein D has the same meaning as above. A is an arylene radical, especially an optionally substituted 1,4-phenylene radical, a = 1 or 2, R$_1$ and R$_2$ are each an optionally substituted alkyl group, and B is the radical of a coupling component such as, for example, a phenol, aminonaphthalene, naphthol, indole, pyrazolone or aminopyrazole radical, or a radical of the pyridine series.

Particularly preferred examples are those of the formula

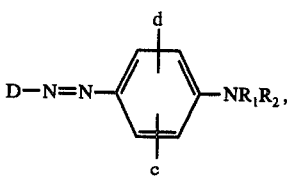

wherein D has the same meaning as above, d is a hydrogen atom, a halogen atom, preferably a chlorine or bromine atom, a low molecular alkyl, alkoxy or alkylmercapto group, such as, for example, a methyl, ethyl, methoxy, ethoxy, methylmercapto or ethylmercapto group, an aryl, arylmercapto or aryloxy group, such as, for example, a phenyl, phenoxy or phenylmercapto group, a cycloalkyl, cycloalkylmethyl or aralkyl radical, such as, for example, a cyclohexyl, cyclohexylmethyl or benzyl radical, or an alkoxycarbonyl radical, such as, for example, a methoxycarbonyl, ethoxycarbonyl or propoxycarbonyl radical, and c has the same meaning or is a trifluoromethyl group or an acylamino radical, and R$_1$ and R$_2$ are hydrogen atoms or optionally substituted alkyl radicals, and especially the dyestuffs of the formula

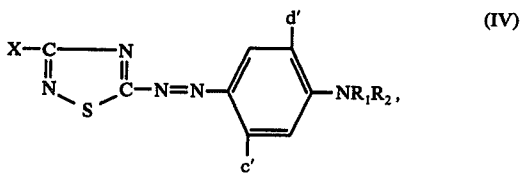

wherein X, R$_1$ and R$_2$ have the same meaning as above, the radicals c' and d' are hydrogen atoms, chlorine atoms or methyl, ethyl, methoxy, ethoxy, phenylthio or phenoxy radicals and X preferably denotes a nitrile or trichloromethyl group.

In addition to the abovementioned groups, the group c' can also denote a bromine atom, a trifluoromethyl group and an acylamino group which is optionally alkylated, preferably methylated, at the nitrogen atom and in which the acyl radical is preferably one of the acyl radicals mentioned below, but preferably the radical of a lower aliphatic monocarboxylic acid.

The dyestuffs listed above include, for example, those of the formula

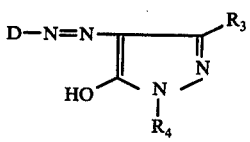

wherein R$_3$ represents a lower alkyl or alkoxy group, a phenyl group, a lower alkoxycarbonyl group or an optionally lower-alkylated aminocarbonyl group and R$_4$ represents a hydrogen atom or an optionally substituted aliphatic, cycloaliphatic, aromatic or heterocyclic group and is preferably a hydrogen atom, an optionally substituted alkyl or aryl group or a sulpholanyl radical; and the dyestuffs (VI) of the formula

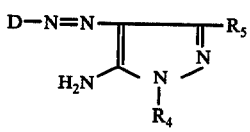

wherein R$_5$ is a hydrogen atom or a lower alkyl, lower alkoxy, nitrile, lower alkoxycarbonyl, carbamoyl, lower alkoxy-lower alkoxycarbonyl, phenoxy or phenyl group and D has the same meaning as above.

The dyestuffs (VII) correspond to the formula

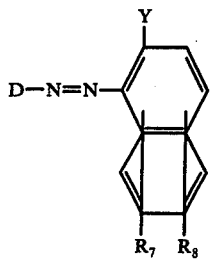

(VII)

wherein Y is OH or $NHR_6$, D has the same meaning as above, $R_6$ is a hydrogen atom or a lower alkyl or phenylalkyl group and $R_7$ and $R_8$ are each hydrogen or halogen atoms or lower alkyl, lower alkoxy, nitro, sulphonylamido, N-lower alkylsulphonamido or N,N-dilower alkylsulphonylamido groups.

The dyestuffs (VIII) correspond to the formula

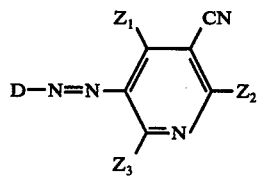

(VIII)

wherein two radicals Z denote groups of the formula $-NR_9R_{10}$ and one radical Z denotes a group of the formulae $-NR_9R_{10}$, $OR_8$ or $-S-R_{11}$, wherein $R_9$, $R_{10}$ and $R_{11}$ each denote hydrogen or an aryl, aralkyl, cycloalkyl or aliphatic radical and $R_9$ and $R_{10}$ can form a ring which contains the amine nitrogen and the radicals $-NR_9R_{10}$ can be identical or different from one another, and D has the same meaning as above.

The dyestuffs (IX) correspond to the formula

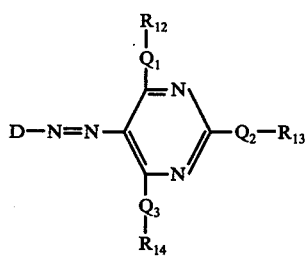

(IX)

wherein $Q_1$ denotes a

bridge and the other Q's independently of one another denote an oxygen or sulphur atom or the $-N(R_{15})-$ bridge, wherein $R_{15}$ is lower alkyl or, preferably, a hydrogen atom and $R_{12}$, $R_{13}$ and $R_{14}$ are optionally substituted hydrocarbon radicals or hydrogen atoms, and D has the same meaning as above.

The dyestuffs (X) correspond to the formula

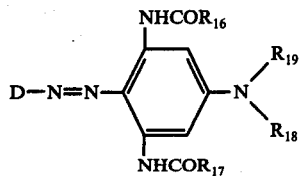

(X)

wherein $R_{16}$ and $R_{17}$ each independently of one another is a hydrogen atom, an optionally substituted alkyl, aryl, alkoxy, aryloxy, alkylamino or arylamino radical or a (alkoxy or aryloxy)carbonyl radical or (alkoxy or aryloxy)carbonylalkyl radical or a (aryloxy, arylthio or arylamino)alkyl radical or a styryl radical or an aralkyl, thiophenyl or pyridyl radical, and $R_{18}$ and $R_{19}$ are alkyl radicals which are optionally interrupted by at least one hetero-atom and/or are optionally substituted, and D has the same meaning as above.

The dyestuffs (XI), of a sub-group of the dyestuffs of the formula (III), correspond to the formula

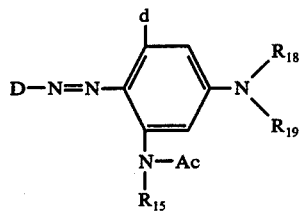

(XI)

wherein Ac is the acyl radical of a lower aliphatic or aromatic carboxylic acid, carbonic acid half-ester, carbamic acid or sulphonic acid or is a radical of the formula $-CO-NH_2$, d is a hydrogen atom, a chlorine or bromine atom or a lower alkyl, lower alkoxy, lower alkylthio, phenyl, phenyloxy, phenylthio, lower alkoxycarbonyl or lower alkylaminocarbonyl group and $R_{15}$, $R_{18}$, $R_{19}$ and D have the same meaning as above.

Preferably, d is bonded in the m-position relative to the azo group.

The dyestuffs of the formula (XII) are 2,6-diaminopyridine derivatives of the general formula

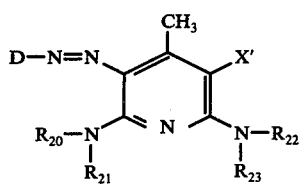

(XII)

in which X' denotes nitrile or carboxylic acid amide, but preferably nitrile, $R_{20}$ denotes hydrogen, alkyl with 1 to 8 C atoms, alkyl optionally substituted by hydroxyl, by alkoxy with 1 to 8 C atoms or by alkylamino with a total of up to 8 C atoms, phenyl, phenyl optionally substituted by chlorine, methyl, ethyl, 2-hydroxyethyl, methoxy or ethoxy, cyclohexyl, benzyl, phenylethyl or ω-N-pyrrolidonylalkyl with 2 or 3 C atoms in the alkyl radical, $R_{21}$ denotes hydrogen, alkyl with 1 to 8 C atoms, or alkyl optionally substituted by hydroxyl, by alkoxy with 1 to 8 C atoms or by alkylamino with a total of up to 8 C atoms, $R_{20}$ and $R_{21}$ together with the nitrogen denote the radical of pyrrolidine, piperidine, morpholine, piperazine or N-methylpiperazine and, independently of one another, $R_{22}$ has the same meaning as $R_{20}$, $R_{23}$ has the same meaning as $R_{21}$ and $R_{22}$ and $R_{23}$ have the same meaning as $R_{20}+R_{21}$; preferably, $R_{20}$ and $R_{22}$ are hydrogen atoms and $R_{21}$ and $R_{23}$ are preferably optionally substituted alkyl groups; D has the same meaning as above.

The radical $R_4$ in the dyestuffs of the formula (VI) is, for example, a hydrogen atom or a methyl, ethyl, propyl, butyl, nitrile, methoxy, ethoxy, propoxy, butoxy, phenoxy, p-tolyloxy, phenyl-(methyl-, ethyl-, propyl- or butyl-)oxycarbonyl, aminocarbonyl, aminosulphonyl, N-mono-(methyl, ethyl, propyl or butyl)aminosulphonyl, N-di-(methyl-, ethyl-, propyl- or butyl-)aminosulphonyl or N-bis(hydroxyethyl)aminosulphonyl group.

The radical $R_5$ is, for example, a radical of the formula

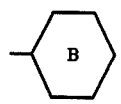

wherein the ring B can additionally be substituted by chlorine or bromine atoms or nitro, trifluoromethyl, methyl, ethyl, propyl, butyl, methoxy, ethoxy, propoxy, butoxy, methylsulphonyl, ethylsulphonyl, phenoxysulphonyl, (methyl-, ethyl-, propyl- or butyl-)carbonylamino, benzoylamino, (methyl-, ethyl-, propyl- or butyl-) sulphanylamino, aminosulphonyl, N-(methyl-, ethyl-, propyl- or butyl-)aminosulphonyl, N,N-di-(methyl-, ethyl-, propyl- or butyl-)aminosulphonyl, —CH$_2$—C$_6$H$_5$, —CH$_2$CH$_2$—C$_6$H$_5$, —C$_6$H$_{11}$, —(CH$_2$)$_{1-6}$ —O—CO— (methyl, ethyl, propyl or butyl) or —(CH$_2$)$_{1-3}$ —NH—CO—(methyl, ethyl, propyl or butyl) groups.

Preferred dyestuffs are those of the formula

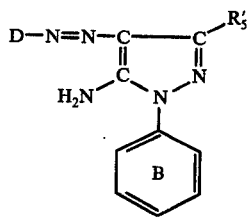

(XIII)

wherein $R'_5$ denotes a lower alkyl radical such as, for example, a methyl, ethyl, propyl or butyl radical, and the phenyl nucleus B can additionally carry a substituent from the group of halogen, hydroxyl, acylamino or lower alkyl, especially chlorine or bromine atoms or hydroxyl, lower alkylcarbonylamino (formylamino, acetylamino, propionylamino or butyrylamino), benzoylamino, methyl, ethyl, propyl or butyl groups.

Further dyestuffs to be mentioned are those of the formula

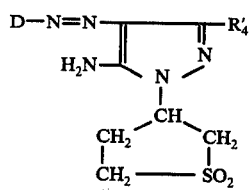

(XIV)

wherein $R'_4$ is a hydrogen atom or an aryl, lower alkoxy or lower alkyl radical, preferably a phenyl, ethoxy and especially methoxy or methyl radical.

The terms "lower", "lower-molecular" and "low-molecular" denote that the alkyl groups which follow (the term) contain 1 to 4 carbon atoms and represent, for example, methyl, ethyl, propyl, ispropyl, butyl and isobutyl radicals; the same remarks apply analogously also to, for example, "lower" alkoxy groups, which can be methoxy, ethoxy, propoxy or butoxy radicals.

The radical $R_6$ as a rule represents a hydrogen atom or a methyl, ethyl, propyl, butyl, benzyl, phenylethyl, hydroxyethyl or cyanoethyl group.

The radicals $R_7$ and $R_8$ for example each denote, independently of one another, hydrogen atoms, chlorine or bromine atoms, or methyl, ethyl, propyl, butyl, methoxy, ethoxy, propoxy, butoxy, nitro, aminosulphonyl, N-(methyl-, ethyl-, propyl- or hydroxyethyl-)aminosulphonyl, N,N-bis-(methyl-, ethyl-, propyl-, butyl- or hydroxyethyl-)aminosulphonyl, methylsulphonyl or ethylsulphonyl or (methoxy- or ethoxy-)sulphonyl groups.

Examples of the radicals $R_9$, $R_{10}$ and $R_{11}$ occurring in the dyestuffs of the formula (V) are methyl, ethyl, propyl, isopropyl, butyl, sec.-butyl, n-pentyl and octyl radicals, which can be interrupted by oxygen atoms and can be substituted by hydroxyl groups, carboxyl groups, carbalkoxy groups (with 2 – 6 carbon atoms), such as (methyl, ethyl, propyl or butyl)oxycarbonyl, alkoxy groups (with 1-8 carbon atoms, such as, for example, methoxy, ethoxy, propoxy, butoxy, hexyloxy or pentyloxy), phenoxy groups, acyloxy groups (with 1–10 carbon atoms), phenyl groups which are optionally substituted by halogen atoms, such as chlorine, bromine or fluorine atoms or by methoxy, ethoxy, propoxy, butoxy, methyl, ethyl, propyl, butyl, β-hydroxyethyl, ethoxycarbonyl, methoxycarbonyl, propoxycarbonyl or butoxycarbonyl groups, or cyclohexyl groups. The radicals $R_9$ and $R_{10}$ can also be linked together to form a piperidine, pyrrolidine, morpholine, piperazine or methylpiperazine ring.

Examples of possible acyl radicals are fatty acid radicals with up to 5 carbon atoms, such as formyl, acetyl, propionyl or butyryl radicals; alkylcarbamyl radicals with up to 5 carbon atoms, such as methylaminocarbonyl, ethylaminocarbonyl, propylaminocarbonyl or butylaminocarbonyl radicals; alkoxycarbonyl radicals with up to 5 carbon atoms, such as methoxycarbonyl, ethoxycarbonyl, propoxycarbonyl or butoxycarbonyl radicals; phenylcarbamyl or phenoxycarbonyl radicals, and benzoyl, phenoxyacetyl, chloroacetyl or phenylacetyl radicals.

Preferred dyestuffs of the formula (V) are those of the formula

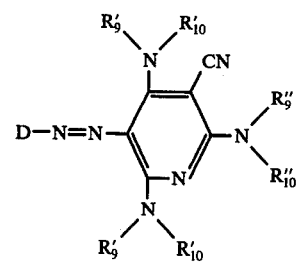

wherein D has the same meaning as above and R'$_9$ and R'$_{10}$ are hydrogen atoms and R''$_9$ and R''$_{10}$ are hydrogen atoms or methyl, ethyl, propyl and/or butyl groups.

Further preferred dyestuffs of the formula (V) are those of the formula

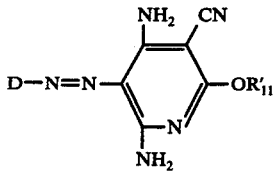

wherein D has the same meaning as above and R'$_{11}$ is a methyl, ethyl, propyl, butyl, pentyl, hexyl, cyclohexyl, phenyl, toluyl, chlorophenyl or acetamidophenyl group.

The radicals R$_{12}$, R$_{13}$ and R$_{14}$ contained in the dyestuffs of the formula VI are, e.g., straight or branched alkyl groups with up to 8 carbon atoms which are optionally substituted by hydroxyl or nitrile groups, lower alkoxy groups or lower alkanoyloxy groups or primary, secondary or tertiary amino groups, or cyclohexyl groups, or benzyl groups, and phenyl radicals which are optionally substituted by halogen atoms, nitro groups, acetyl groups, benzoyl groups, nitrile groups, thiocyano groups, lower alkyl groups, lower alkoxy groups, trifluoromethyl groups, lower alkylsulphonyl groups, phenoxysulphonyl groups, lower alkylphenoxysulphonyl groups, p-toluenesulphonamide groups, lower alkoxycarbonyl groups, lower alkoxy-lower alkoxycarbonyl groups, benzoylamino groups or acetylamino groups. The radical R$_{15}$ is a lower alkyl group or, preferably, a hydrogen atom.

In the dyestuffs of the formula VI, preferably 2 radicals Q denote -NR$_{15}$-bridges and as a rule in that case Q$_1$ and Q$_3$ are each a

bridge.

A particular embodiment of the invention are the dyestuffs of the formula

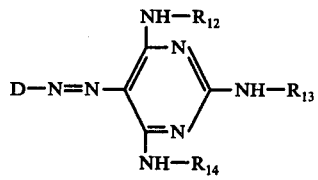

The radicals —CO—R$_{16}$ and —CO—R$_{17}$ in the dyestuffs of the formula (X) can be identical or different from one another.

The radicals —CO—R$_{16}$ and —CO—R$_{17}$ and the radical Ac in the dyestuffs of the formula VIII are unsubstituted or substituted fatty acid radicals, such as formyl, acetyl, propionyl, butyryl, 1-methylbutyryl, hexanoyl, crotonyl, octanoyl, decanoyl, dodecanoyl, hexadecanoyl, palmityl or stearyl radicals, or a glycollic acid or methylmercaptoacetic acid radical, or a chloroacetyl, α,β-dibromopropionyl or dichloropropionyl, β-bromopropionyl, 4-chlorobutyryl, cyanoacetyl, acetoacetyl, ethoxyacetyl, bromoacetyl, 2-phenylbutyryl, 4-benzoyl-butylryl, 4-phenyl-butyryl, cyclohexanebutyryl, 2-bromostearyl, 11-bromoundecanoyl, palmitoyl, glycoyl and 3- and 4-hydroxybutyryl radicals.

Further possible radicals —CO—R$_{16}$, —CO—R$_{17}$ and Ac are: the half-esterified dicarboxylic acid radicals of the general formula (aryloxy or lower alkoxy)—CO—(CH$_2$)$_{m-1}$—CO—, wherein m is 1 - 9. Examples thereof are, for instance, the methoxycarbonylcarbonyl radical, the C$_2$H$_5$—O—CO—(CH$_2$)$_4$—CO— radical and the p-CH$_3$—C$_6$H$_4$—O—CO—CH$_2$CH$_2$—CO— radical, half-esterified acyl radicals of oxalic acid, such as the radicals of the formulae CH$_3$—O—CO—CO—, C$_4$H$_9$—O—CO—CO—, p—Cl—C$_6$H$_4$—O—CO—CO, O—CH$_3$—C$_6$H$_4$—O—CO—CO—, p—CH$_3$C$_6$H$_4$O—CO—CO and p—C$_2$H$_5$—O—C$_6$H$_4$—O—CO—CO—, the radicals of cycloaliphatic carboxylic acids, such as the cyclohexanecarbonyl, methylcyclohexanecarbonyl and dimethylcyclohexanecarbonyl radical, the radicals of araliphatic carboxylic acids, such as the phenylacetyl, β-phenylpropionyl, phenoxyacetyl, (p-nitro, p-acetyl, o-butoxycarbonyl, o-methoxy, p-butoxy, p-methyl, p-bromo, 3,5-dichloro, p-ethyl, and p-chloro)phenoxyacetyl, phenoxypropionyl, phenoxybutyryl, phenoxythioacetyl, 3,5-dichlorophenylthioacetyl, p-methoxycarbonylphenylmercaptoacetyl, α-phenyl-mercapto-propionyl, γ-(p-nitrophenylmercapto)butyryl, phenyl-amino-acetyl, p-chlorophenylaminoacetyl, m-ethylphenylaminoacetyl, N-morpholinoacetyl, styrylcarbonyl and cinnamylcarbonyl radical, the radicals of aromatic carboxylic acids, such as the benzoyl, methylbenzoyl, p-chlorobenzoyl, p-nitrobenzoyl, 3,5-dinitrobenzoyl, methoxybenzoyl, 4-phenoxybenzoyl, 4-phenylbenzoyl, 4-phenylmercapto-benzoyl, 4-phenylazobenzoyl, α-naphthoyl and β-naphthoyl radical, and the radicals of heterocyclic carboxylic acids, such as the furoyl, nicotinyl, thiophene-2-carbonyl or pyridine-3- or -4-carbonyl radical.

The acyl radicals —CO—R$_{16}$, —CO—R$_{17}$ and Ac can also be derived from alkyl or aryl half-esters of carbonic acid, and R$_{16}$ and R$_{17}$ then represent C$_1$-C$_8$-alkoxy groups or optionally substituted phenoxy groups, such as, for example, methoxy, ethoxy, n-propoxy, isopropoxy, β-chloroethoxy, β-methoxy-ethoxy, n-butoxy, isobutoxy and hexyloxy groups, and also phenoxy, chlorophenoxy, bromophenoxy, nitrophenoxy, carboethoxyphenoxy, methoxyphenoxy, methylphenoxy or ethylphenoxy radicals.

The acyl radicals —COR$_{16}$, —COR$_{17}$ and Ac can also be derived from alkylcarbamic, cycloalkylcarbamic or arylcarbamic acids and heterocyclic carbamic acids, and R$_{16}$ and R$_{17}$ in that case represent C$_1$-C$_8$-alkylamino, cyclohexylamino or optionally substituted phenylamino groups, such as, for example, methylamino, ethylamino, propylamino, butylamino, octylamino, cyclohexylamino, phenylamino, (chloro, bromo, methyl, methoxy, ethoxy, nitro, trifluoromethyl, methoxycarbonyl or ethoxycarbonyl)phenylamino, dimethylphenylamino, naphthylamino, 3-pyridylamino, 3-tetramethylenesulphonamino, furfurylamino or thiophenamino groups.

The groups R$_1$, R$_2$, R$_{18}$ and R$_{19}$ can be hydrogen atoms or lower alkyl groups, that is to say alkyl groups containing 1 to 4, preferably 2 to 4, carbon atoms, such as methyl, ethyl, n-propyl or n-butyl groups, which can be interrupted by one or two oxygen atoms and/or be substituted in the usual manner. Possible substituents are: halogen atoms, preferably fluorine, chlorine or bromine atoms or phenyl, lower alkoxy, lower alkylcarbonyloxy, lower alkylcarbonylamino, benzoyloxy, benzoylamino (wherein the benzoyl groups can be substituted by chlorine, bromine, methyl, ethyl, methoxy and ethoxy groups), nitrile, hydroxyl, phenoxy, phenylcarbonyl, phenylsulphonyloxy, phenoxycarbonyl, phenylthio (wherein the phenyl groups can in each case be substituted by chloro, bromo, methyl, ethyl, methoxy or ethoxy groups), lower alkylsulphonyl, lower alkoxycarbonyloxy, phenoxycarbonyloxy and phenylaminocarbonyloxy, aminocarbonyl, mono-lower alkylaminocarbonyl, di-lower alkylaminocarbonyl, lower alkylcarbonyl, succinimido, phthalimido, lower alkoxycarbonyl, cinnamoyl, thiophenecarbonyl, pyridinecarbonyl, phenoxyalkylcarbonyloxy, phenylaminoalkylcarbonyloxy, or (lower alkoxy or phenoxy)carbonylalkylcarbonyl-(oxy or amino) groups.

Examples of suitable groups $R_1$, $R_2$, $R_{18}$ and/or $R_{19}$ are those of the formulae $CH_2CH_2Cl$, $CH_2CH_2Br$, $CHCl-CH_2Cl$, $CH_2CH_2CN$, $CH_2-CH(OH)-CH_2Cl$, $CH_2C_6H_5$, $CH_2CH_2C_6H_5$, $CH_2CH_2OH$, $CH_2-CH_2-O-CH_3$, $CH_2-CH_2-O-C_4H_9$, $-C_4H_8-O-C_4H_9$, $CH_2CH_2-O-CH_2-CH_2-OCH_3$, $-CH_2CH_2-O-CH_2CH_2-OH$, $CH_2CH_2-O-CH_2CH_2-OCOCH_3$, $-CH_2CH_2-O-CH_2CH_2-CN$, $-(CH_2)_{1,2\ or\ 3}CO-O-(CH_3, C_2H_5, C_3H_7, C_4H_9, C_6H_5)$ $-(CH_2)_{1,2\ or\ 3}CO-NH-(CH_3, C_2H_5, C_3H_7, C_4H_9, C_6H_5)$ $-CH_2-CH_2-O-COCH_2Cl$, $-CH_2CH_2-O-CO-CHBr-CH_2Br$, $-CH_2-CH(OCOCH_3)-CH_2-O-C_6H_5$ $-CH_2-CH_2-O-CO-CH=CH_2$, $-CH_2-CH(OCOCH_3)-CH_2OCOCH_3$, $-(CH_2)_{1-3}-O-CO(H, CH_3, C_2H_5, C_3H_7, C_4H_9)$ $-(CH_2)_{1-3}-NH-CO(H, CH_3, C_2H_5, C_3H_9, C_4H_9)$ $-(CH_2)_{1-3}-O-CO(C_6H_5, C_6H_4Cl, C_6H_4Br, C_6H_4OCH_3, C_6H_4CH_3)$ $-(CH_2)_{1-3}-O-CO-O(CH_3, C_2H_5, C_3H_7, C_4H_9)$ $-(CH_2)_{1-3}-O-CO-O-(C_6H_5, C_6H_4Cl, C_6H_4Br, C_6H_4OCH_3, C_6H_4CH_3)$ $-(CH_2)_{1-3}-O-CO-NH(CH_3, C_2H_5, C_3H_7, C_4H_9)$ $-(CH_2)_{1-3}-O-CO-NH(C_6H_5, C_6H_4OCH_3, C_6H_4CH_3)$ $-CH_2CH_2-O-CH_2-O-C_6H_5$ and $-CH_2CH_2-O-CO-CH_2-C_6H_5$.

The radical Ac can not only have the meanings indicated for $-CO-R_{15}$ and $-CO-R_{16}$ but can also represent an alkylsulphonyl or benzenesulphonyl group, such as, for example, a methanesulphonyl, ethanesulphonyl, butanesulphonyl, propanesulphonyl, benzenesulphonyl, p-toluenesulphonyl, p-bromotoluenesulphonyl or p-nitrobenzenesulphonyl group.

The coupling components used for the manufacture of the azo dyestuffs are any desired coupling components free from acid groups which confer solubility in water, for example those of the benzene or naphthalene series or of the series of heterocyclic coupling components. Amongst the coupling components of the benzene series there should not only be mentioned the phenols, such as m- or p-cresol, resorcinol and 1-hydroxy-3-cyanomethyl-benzene, but in particular also the aminobenzenes, for example aniline, 3-methylaniline, 2-methoxy-5-methylaniline, 3-acetylamino-1-aminobenzene, N-methylaniline, N-β-hydroxyethylaniline, N-β-methoxyethylaniline, N-β-cyanoethylaniline, N-β-chloroethylaniline, dimethylaniline, diethylaniline, N-methyl-N-(benzyl or β-phenylethyl)-aniline, N-n-butyl-N-β-chloroethylaniline, N-(methyl, ethyl, propyl or butyl)-N-β-cyanoethylaniline, N-methyl-N-β-hydroxyethylaniline, N-ethyl-N-β-chloroethylaniline, N-methyl-N-β-acetoxyethylaniline, N-acetyl-N-β-methoxyethylaniline, N-β-cyanoethyl-N-β-chloroethylaniline, N-cyanoethyl-N-(acetoxy- or benzoyloxyethyl)aniline, N,N-di-α-hydroxyethylaniline, N,N-di-β-acetoxyethylaniline, N-ethyl-N-2-hydroxy-3-chloropropylaniline, N,N-di-β-cyanoethylaniline, N,N-di-β-cyanoethyl-3-methylaniline, N-β'-cyanoethyl-N-β''-hydroxyethyl-3-chloroaniline, N,N-di-β-cyanoethyl-3-methoxyaniline, N,N-dimethyl-3-acetylamino-aniline, N-ethyl-N-β-cyanoethyl-3-acetylaminoaniline, N,N-di-β-cyanoethyl-2-methoxy-5-acetylaminoaniline, N-methyl-N-phenylacylaniline, N-β-cyanoethyl-2-chloroaniline, N,N-diethyl-3-trifluoromethylaniline, N-ethyl-N-phenylaniline, diphenylamine, N-methyldiphenylamine, N-methyl-4-ethoxydiphenylamine or N-phenylmorpholine, and also, for example, amines of the formula

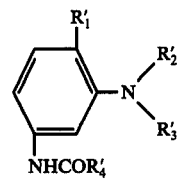

wherein $R_1'$ denotes a hydrogen atom or an alkyl or alkoxy group, $R_2'$ denotes a cyanoalkoxyalkyl group, $R_3'$ denotes a hydrogen atom, a cyanoalkoxyalkyl group or an acyloxyalkyl group and $R_4'$ denotes a hydrogen atom, an optionally substituted alkyl, cycloalkyl or alkoxy group or a benzene radical, and especially those of the formula

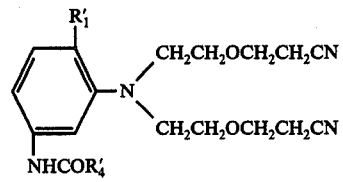

wherein $R'_1$ and $R'_4$ have the indicated meaning.

Equally particularly valuable results are obtained with coupling components of the formulae

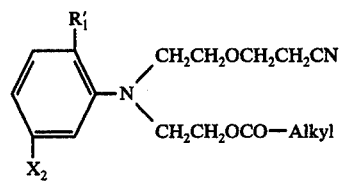

and

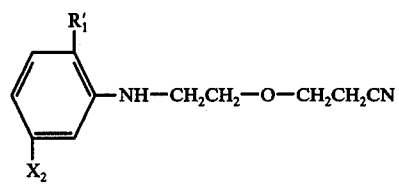

wherein $R'_1$ has the indicated meaning and $X_2$ denotes an acylamino group, and wherein alkyl denotes, for example, a methyl, ethyl or propyl group.

The following coupling components may be mentioned as such examples:

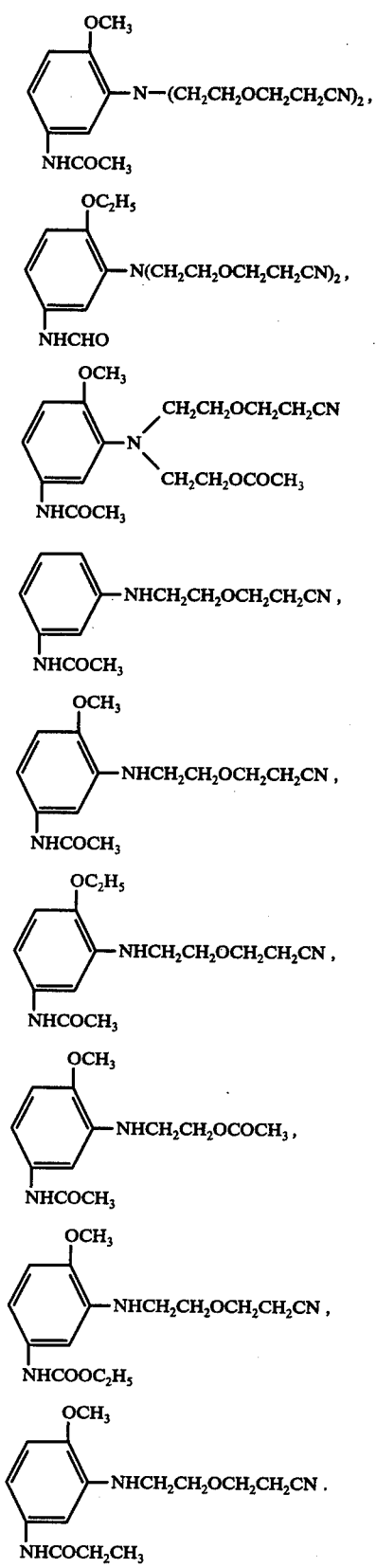

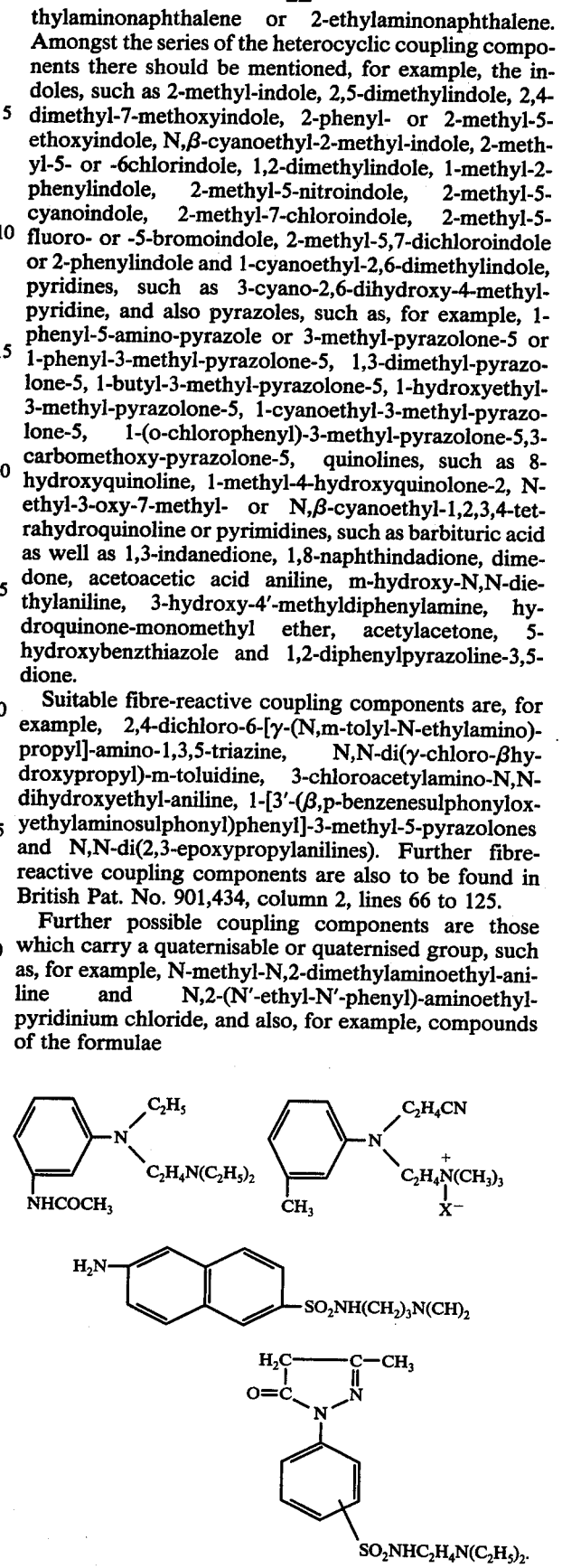

Amongst the series of the coupling components of the naphthalene series there should be mentioned not only the naphthols but also, for example, 1- or 2-naphthylamine and 2-phenylaminonaphthalene, 1-dimethylaminonaphthalene or 2-ethylaminonaphthalene. Amongst the series of the heterocyclic coupling components there should be mentioned, for example, the indoles, such as 2-methyl-indole, 2,5-dimethylindole, 2,4-dimethyl-7-methoxyindole, 2-phenyl- or 2-methyl-5-ethoxyindole, N,β-cyanoethyl-2-methyl-indole, 2-methyl-5- or -6chlorindole, 1,2-dimethylindole, 1-methyl-2-phenylindole, 2-methyl-5-nitroindole, 2-methyl-5-cyanoindole, 2-methyl-7-chloroindole, 2-methyl-5-fluoro- or -5-bromoindole, 2-methyl-5,7-dichloroindole or 2-phenylindole and 1-cyanoethyl-2,6-dimethylindole, pyridines, such as 3-cyano-2,6-dihydroxy-4-methylpyridine, and also pyrazoles, such as, for example, 1-phenyl-5-amino-pyrazole or 3-methyl-pyrazolone-5 or 1-phenyl-3-methyl-pyrazolone-5, 1,3-dimethyl-pyrazolone-5, 1-butyl-3-methyl-pyrazolone-5, 1-hydroxyethyl-3-methyl-pyrazolone-5, 1-cyanoethyl-3-methyl-pyrazolone-5, 1-(o-chlorophenyl)-3-methyl-pyrazolone-5,3-carbomethoxy-pyrazolone-5, quinolines, such as 8-hydroxyquinoline, 1-methyl-4-hydroxyquinolone-2, N-ethyl-3-oxy-7-methyl- or N,β-cyanoethyl-1,2,3,4-tetrahydroquinoline or pyrimidines, such as barbituric acid as well as 1,3-indanedione, 1,8-naphthindadione, dimedone, acetoacetic acid aniline, m-hydroxy-N,N-diethylaniline, 3-hydroxy-4'-methyldiphenylamine, hydroquinone-monomethyl ether, acetylacetone, 5-hydroxybenzthiazole and 1,2-diphenylpyrazoline-3,5-dione.

Suitable fibre-reactive coupling components are, for example, 2,4-dichloro-6-[γ-(N,m-tolyl-N-ethylamino)-propyl]-amino-1,3,5-triazine, N,N-di(γ-chloro-βhydroxypropyl)-m-toluidine, 3-chloroacetylamino-N,N-dihydroxyethyl-aniline, 1-[3'-(β,p-benzenesulphonyloxyethylaminosulphonyl)phenyl]-3-methyl-5-pyrazolones and N,N-di(2,3-epoxypropylanilines). Further fibre-reactive coupling components are also to be found in British Pat. No. 901,434, column 2, lines 66 to 125.

Further possible coupling components are those which carry a quaternisable or quaternised group, such as, for example, N-methyl-N,2-dimethylaminoethyl-aniline and N,2-(N'-ethyl-N'-phenyl)-aminoethyl-pyridinium chloride, and also, for example, compounds of the formulae Further coupling components which can be used are diazotisable amines, such as, for example, 1-amino-3- methylbenzene, 1-amino-2-methoxy-5-methylbenzene, 1-amino-naphthalene and the like, so that aminoazo dyestuffs are produced, which can in turn be diazotised and be combined with the coupling components mentioned earlier to form disazo or polyazo dyestuffs.

Instead of a single diazo component it is also possible to use a mixture of two or more of the diazo components according to the invention, and instead of a single coupling component it is also possible to use a mixture of two or more of the coupling components according to the invention.

The coupling components used in the present dyestuffs can also be classified under the headings anilines, phenols, naphthols and compounds with an active methylene group, which are defined, for example, in the textbook "The Aromatic Diazo Compounds" by K. H. Saunders, London 1949, page 209.

The diazo components mentioned can be diazotised with, for example, concentrated phosphoric acid and sodium nitrite or with, for example, a solution of nitrosylsulphuric acid in concentrated sulphuric acid.

The coupling can also be carried out in a manner which is in itself known, for example in a neutral to acid medium, optionally in the presence of sodium acetate or similar buffer substances, or catalysts, which influence the coupling speed, such as, for example, dimethylformamide, pyridine or its salts.

The coupling can also be carried out advantageously by combining the components in a mixing nozzle. The latter is to be understood as a device in which the liquids to be mixed are combined with one another in a relatively small space, with at least one liquid being passed through a nozzle, preferably under elevated pressure. The mixing nozzle can, for example, be constructed, and operated, in accordance with the principle of a water pump, with the feed of one liquid in the mixing nozzle corresponding to the feed of water in the water pump and the feed of the other liquid into the mixing nozzle corresponding to the connection to the vessel to be evacuated by the water pump; the latter liquid feed can also take place under elevated pressure.

The dyestuffs can be quaternised because of the nitrogen atom in the thiadiazole ring and also if the radical A contains a quaternisable nitrogen atom, such as, for example, a pyridine group; the quaternisation is preferably carried out as the last stage.

The quaternisation is carried out by treatment with esters of strong mineral acids or organic sulphonic acids, such as, for example, dimethyl sulphate, diethyl sulphate, alkyl halides, such as methyl chloride, bromide or iodide, aralkyl halides, such as benzyl chloride, esters of low-molecular alkanesulphonic acids, such as, for example, the methyl ester of methanesulphonic, ethanesulphonic or butanesulphonic acid and the alkyl esters of (4-methyl, 4-chloro or 3- or 4-nitro)-benzenesulphonic acid, which form halogen, sulphuric acid half-ester, alkanesulphonic acid or benzenesulphonic acid anions as the anions, preferably with warming in inert organic solvents, for example xylene, carbon tetrachloride, o-dichlorobenzene and nitrobenzene. However, it is also possible to use solvents such as acetic anhydride, dimethylformamide, acetonitrile or dimethylsulphoxide. The quaternised dyestuffs preferably contain, as the anion Y⁻, the radical of a strong acid, such as of sulphuric acid or its half-esters, or a halide ion, but they can also be used as double salts, for example with zinc chloride, or as free bases.

The new water-insoluble dyestuffs, their mixtures with one another and their mixtures with other azo dyestuffs are outstandingly suitable for dyeing and printing leather, wool, silk and, above all, synthetic fibres, such as, for example, acrylic fibers or acrylonitrile fibres of polyacrylonitrile or of copolymers of acrylonitrile and other vinyl compounds, such as acrylic esters, acrylamides, vinylpyridine, vinyl chloride or vinylidene chloride, or of copolymers of dicyanoethylene and vinyl acetate, or of acrylonitrile block copolymers, fibres of polyurethanes, polypropylene fibres, especially fibres of polypropylene modified with metals, above all with nickel, and also cellulose triacetate and cellulose 2½-acetate fibres and especially fibres of polyamides, such as nylon-6, nylon-6,6 or nylon 12 and fibres of aromatic polyesters, such as those of terephthalic acid and ethylene glycol or 1,4-dimethylolcyclohexane, and copolymers of terephthalic acid and isophthalic acid and ethylene glycol. The dyestuffs belong to the category of the disperse dyestuffs.

Accordingly, a further subject of the invention is a process for dyeing or printing textile material based on synthetic fibres, especially on polyester fibres and polypropylene fibres modified with metal compounds or, if the dyestuffs are quaternised, on acrylic fibres, which is characterized in that dyestuffs, free from groups which confer solubility in water, of the formula

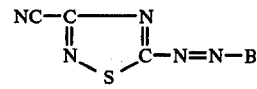

wherein B represents the radical of a coupling component free from acid groups which confer solubility in water, are used.

For dyeing in aqueous liquors, the water-insoluble dyestuffs are preferably used in a finely divided form and dyeing is carried out with addition of dispersing agents, such as sulphite cellulose waste liquor or synthetic detergents or a combination of different wetting agents and dispersing agents. As a rule it is desirable to convert the dyestuffs to be used, prior to dyeing, into a dyeing preparation which contains a dispersing agent and a finely divided dyestuff in such form that on dilution of the dyestuff preparations with water a fine dispersion results. Such dyestuff preparations can be obtained in a known manner, for example by grinding the dyestuff in a dry or wet form with or without addition of dispersing agents during the grinding process.

To achieve deep dyeings on polyethylene terephthalate fibres it proves desirable to add a swelling agent to the dye bath or to carry out the dyeing process under pressure at temperatures above 100° C, for example at 130° C. Suitable swelling agents are aromatic carboxylic acids, for example salicyclic acid, phenols, for example o- or p-hydroxydiphenyl, aromatic halogen compounds, such as o-dichlorobenzene, or diphenyl.

To thermofix the dyestuff, the padded polyester fabric is heated, suitably after prior drying, for example in a warm stream of air, to temperatures of above 100° C, for example of between 180° and 210° C.

The dyeings obtained in accordance with the present process can be subjected to an after-treatment, for example by heating with an aqueous solution of a nonionic detergent.

Instead of being applied by impregnation, the dyestuffs indicated can, according to the present process, also be applied by printing. For this purpose one uses, for example, a printing ink which contains the finely disperse dyestuff in addition to the auxiliaries customary in printing, such as wetting agents and thickeners.

The present process gives strong dyeings and prints of good fastness properties. Good fastness properties are also achieved when using the dyestuffs by the transfer printing process, in which the dyestuffs are applied to the textile substrate by sublimation from a temporary carrier, for example paper, or in the case of application from solvents, where the dyestuff is applied to the textile article to be dyed from a solvent, in which the dyestuff is present in solution or as a fine dispersion. Examples of solvents which can be used are petroleum fractions and above all chlorinated hydrocarbons, (for example perchloroethylene) which can be used by themselves or as a dispersion together with water.

The new water-insoluble dyestuffs can also be used for the spin dyeing of polyamides, polyesters and polyolefines. The polymer to be dyed, preferably in the form of powders, granules or chips, or as a finished spinning solution or in the fused state, is mixed with the dyestuff which is introduced in the dry state or in the form of a dispersion or solution in a solvent, which can be volatile if desired. After homogeneous distribution of the dyestuff in the solution or melt of the polymer, the mixture is processed in a known manner by casting, pressing or extrusion to give fibres, yarns, monofilaments, films and the like.

The new dyestuffs are also particularly suitable for dyeing metal-modified polyolefine fibres, especially nickel-modified polypropylene fibres, above all if the coupling component carries a hydroxyl group in the o-position relative to the azo group.

The quaternised dyestuffs obtained in accordance with the process preferably contain, as the anion, the radical of a strong acid, for example of sulphuric acid, or of its half-ester, or of an arylsulphonic acid, or a halogen ion. The anions mentioned, introduced into the dyestuff molecule in accordance with the process, can also be replaced by anions of other inorganic acids, for example of phosphoric acid or of sulphuric acid, or of organic acids, such as, for example, of formic acid, lactic acid or tartaric acid; in certain cases the free bases can also be used. The dyestuff salts can also be used in the form of double salts, for example with halides of the elements of the second group of the periodic system, especially zinc chloride or cadmium chloride.

The quaternised dyestuffs or dyestuff salts obtained in accordance with the invention are suitable for dyeing and printing very diverse fully synthetic fibres, such as, for example, polyvinyl chloride fibres, polyamide fibres, polyurethane fibres, base-modified polypropylene fibres and base-modified polyester fibres, but especially polyacrylonitrile fibres.

The quaternised, water-soluble dyestuffs are generally rather insensitive to electrolytes and in some cases show a markedly good solubility in water or polar solvents. Dyeing with the quaternised water-soluble dyestuffs is in general carried out in an aqueous, neutral or acid medium, at the boil under atmospheric pressure or in a closed vessel at elevated temperature and elevated pressure. The commercially available levelling agents can be used.

In the examples which follow, the parts, unless stated otherwise, denote parts by weight and the percentages denote percentages by weight.

PREPARATION OF THE DIAZO COMPONENTS (a) 49.2 parts (0.4 mol) of N-chloro-cyanoformimide acid chloride are dissolved in 600 parts by volume of absolute ether and the solution is cooled to $-30°$ C. 15.3 prts (0.9 mol) of ammonia are introduced over the course of 2 hours at $-30°$ C to $-20°$ C. After 30 minutes, the ammonium chloride formed is filtered off and the filtrate is evaporated at room temperature. 28.2 parts (68%) of N-chlorocyanoformamidine of the formula

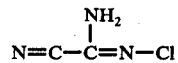

are obtained. The product is used in the crude state for further conversion. A sample recrystallised from water, and having a melting point of 110° C, gave the following analysis:

Calculated for $C_2H_2ClN_3$: C 23.21% H 1.95% Cl 34.24% N 40.60% Found: C, 23.07% H 1.96% Cl 34.10% N 40.62%

(b) 28.9 parts (0.28 mol) of N-chloro-cyanoformamidine are dissolved in 140 parts by volume of methanol and the solution is added dropwise to a solution of 28.6 parts (0.29 mol) of potassium thiocyanate in 345 parts by volume of methanol at 0°–5° C. The solution is stirred for a further 30 minutes at 0°–5° C and the potassium chloride formed is then filtered off. The filtrate is evaporated in vacuo at room temperature down to a small volume. The product which has precipitated is filtered off and washed with a little water. It corresponds to the formula

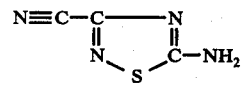

and is obtained in a yield of 11.2 parts (melting point 147° to 150° c).

A sample recrystallised from water (melting point 148° to 150° C) gave the following analysis:

Calculated for $C_3H_2N_4S$: C 28.57% H 1.60% N 44.42% S 25.42% Found: C 28.40% H 1.74% N 44.27% S 25.05%.

(c) 11.8 parts (0.06 mol) of N-chloro-trichloroacetamidine are dissolved in 35 parts by volume of 50% strength methanol. A solution of 6.5 parts (0.066 mol) of potassium thiocyanate is added dropwise to the above solution at 0 to 5° C. After standing for one hour at 0° to 5° C, a precipitate forms, which is filtered off after 4 hours and is recrystallised from aqueous alcohol with addition of active charcoal. 8.4 parts of 3-trichloromethyl-5-amino-1,2,4-thiadiazole are isolated. Melting point 192° to 194° C (with decomposition).

Analysis for $C_3H_5Cl_3N_3S$: Calculated C 16.5% H 0.9% Cl 48.7% N 19.2% S 14.7% Found C 16.72% H 1.0% Cl 48.5% N 19.3% S 14.8%.

The diazo components in which X is $CBr_3$, $(CN)_2CCl$ or $CN-CCl_2$, wherein X relates to the formula first mentioned in the introduction, can also be prepared analogously.

In the following examples, the benzene ring is designated by a simple hexagon and the naphthalene ring is designated by two fused hexagons.

EXAMPLE 1

2.8 parts of concentrated sulphuric acid and 3 parts of nitrosylsulphuric acid (containing approx. 12.6% of $N_2O_3$) are mixed whilst cooling and the mixture is diluted with 10 parts of propionic acid/glacial acetic acid,

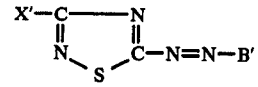

|  | X' | B' | Colour shade on polyester fibres |
|---|---|---|---|
| 1 | CN | N-Benzyl-N-cyanoethylaniline | Red |
| 2 | CN | N-Benzyl-N-ethylaniline | Bluish-tinged red |
| 3 | CN | N-Ethyl-N-phenylaminocarbonyloxyethyl-m-toluidine | " |
| 4 | CCl₃ | " | " |
| 5 | CN | N-Ethyl-N-β-cyanoethylaniline | " |
| 6 | CN | N,N-Di-β-cyanoethyl-m-toluidine | " |
| 7 | CN | N-Ethyl-N-(2'-carboxyethyl)-m-toluidine | " |
| 8 | CN | N,N-Di-β-hydroxyethyl-m-chloroaniline | Violet |
| 9 | CN | N-β-Benzoyloxyethyl-N-β-cyanoethylaniline | " |
| 10 | CN | N-β-Cyanoethyl-N-β-(2'-methyl-5'-pyridyl)-ethyl-m-anisidine | " |
| 11 | CN | N-Acetylmethyl-N-β-phenoxyethylaniline | Red |
| 12 | CN | N-β-Cyanoethyl-N-β-phenylcarbonylethyl-m-toluidine | Bluish-tinged red |
| 13 | CN | N-β-Cyanoethyl-N-β-phenacetylaniline | " |
| 14 | CN | N-β-Cyanoethyl-N-β-Cyanoethyl-N-β-n-butylaminocarbonyloxyethyl-aniline | " |
| 15 | CN | N-β-Ethoxycarbonylethyl-N-β-phenoxycarbonyloxyethylaniline | Bluish-tinged red |
| 16 | CN | N-β-Cyanoethyl-N-β-methoxyethyl-3-benzoylaminoaniline | Violet |
| 17 | CN | N-β-Aminocarbonyl-N-n-butyl-m-toluidine | Reddish-tinged blue |
| 18 | CN | N-β-Cyanoethyl-N-γ-phenylaminocarbonyloxypropylaniline | Red |
| 19 | CN | 3-N-β-Cyanoethylaminodiphenyl-ether | Red |
| 20 | CN | N-β-γ-Dihydroxypropyldiphenylamine | Blue |
| 21 | CN | N-β-Phenyl-β-hydroxyethyl-N-ethylaniline | Blue |
| 22 | CN | N-γ-Nicotinyloxypropyl-N-β-cyanoethyl-3-trifluoromethyl-aniline | Bluish-tinged red |
| 23 | CN | 3-N-β-Cyanoethylaminodiphenyl | " |
| 24 | CN | 1-(2',5'-Dichlorophenyl)-3-methyl-5-pyrazolone | Orange |
| 25 | CN | 1-β-Hydroxyethyl-3-methyl-5-aminopyrazole | " |
| 26 | CN | 2-Methylindole | Yellow-red |
| 27 | CCl₃ | N-Ethyl-N-β-cyanoethylaniline | Bluish-tinged red |
| 28 | CCl₃ | N-Ethyl-N-β-phthalimidoethyl-m-toluidine | Violet |
| 29 | CCl₃ | 3-Ethanesulphonamidoaniline | Bluish-tinged red |
| 30 | CCl₃ | N-Ethyl-N-β-phenoxycarbonylethylaniline | Bluish-tinged red |
| 31 | CCl₃ | N-β-Cyanoethyl-N-β-phenacethylaniline | " |
| 32 | CCl₃ | 3-Acetylaminodiphenylamine | Reddish-tinged blue |
| 33 | CCl₃ | N-β-Cyanoethyl-N-β-n-butylaminocarbonyloxyethylaniline | Bluish-tinged red |
| 34 | CCl₃ | N-β-Aminocarbonyl-N-n-butyl-m-toluidine | Reddish-tinged blue |
| 35 | CCl₃ | N-β-Phenylsulphonylaminoethyl-N-propylaniline | Violet |
| 36 | CCl₃ | 3-N-β-Cyanoethylaminodiphenyl-ether | Red |
| 37 | CCl₃ | N-β-Acetylaminoethyl-N-isopropylaniline | Reddish-tinged blue |
| 38 | CCl₃ | N-β-Phenylacetoxyethyl-N-β-cyanoethylaniline | Bluish-tinged red |
| 39 | CCl₃ | 1-β-Hydroxyethyl-3-methyl-5-aminopyrazole | Orange |
| 40 | CCl₃ | 2-Methylindole | Yellow-red |

3:17. 2.18 parts (0.01 mol) of 3-trichloromethyl-5-amino-1,2,4-thiadiazole are introduced into this solution at 0° to 5° C, followed by 10 parts of propionic acid/glacial acetic acid 3:17. The mixture was stirred for 2 hours at 0° to 5° C and a solution of 2.5 parts (0.01 mol) of N-benzyl-N-cyanoethylaniline in 70 parts by volume of methanol was added dropwise to the clear solution obtained. The mixture was stirred for 2 hours at 0° to 5° C and then for 10 hours at room temperature, and then poured into ice water. The product was filtered off, washed until free from acid and dried in vacuo at 50° C. The dyestuff corresponds to the formula

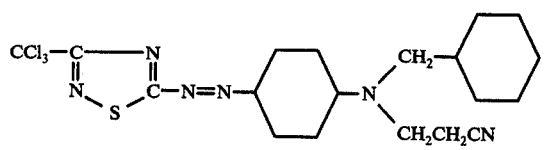

and dyes polyester fibres in yellowish-tinged red shades.

The dyestuffs listed in the table which follows are obtained by replacement of equivalent amounts of diazo component or coupling component in Example 1:

CARRIER DYEING 100 parts of polyethylene terephthalate fibre material are pre-cleaned for half an hour in a bath which contains, per 1,000 parts of water, 1 to 2 parts of the sodium salt of N-benzyl-μ-heptadecylbenzimidazoledisulphonic acid and 1 part of concentrated aqueous ammonia solution. The material is then treated for 15 minutes at 50° C in a dye bath which contains 9 parts of diammonium phosphate and 1.5 parts of the sodium salt of N-benzyl-μ-heptadecylbenzimidazoledisulphonic acid in 3,000 parts of water. 9 parts of sodium o-phenylphenolate, as a solution are then added gradually and thereafter the absorption of the o-phenylphenol liberated is effected by agitating the textile material for 15 minutes at 50° to 55° C. The dyestuff preparation obtained according to Example 2, paragraph 1 is then added. The bath is now brought to the boil over the course of ½ to ¾ hour and dyeing is carried out for 1 to 1½ hours as near to the boil as possible. The material is then well rinsed and optionally washed with a solution which contains 1 part of the sodium salt of N-benzyl-μ-heptadecylbenzimidazoledisulphonic acid per 1,000 parts of water for ½ hour at 60° to 80° C. A yellowish-tinged red dyeing of excellent fastness to sublimation and to light is obtained.

HIGH TEMPERATURE DYEING 1 part of the dyestuff obtained according to Example 1 is ground wet with 2 parts of a 50% strength aqueous solution of the sodium salt of dinaphthylmethanedisulphonic acid and the mixture is dried.

This dyestuff preparation is stirred with 40 parts of a 10% strength aqueous solution of the sodium salt of N-benzyl-μ-heptadecyl-benzimidazoledisulphonic acid and 4 parts of a 40% strength acetic acid solution are added. 4,000 parts of a dye bath are prepared from this mixture by dilution with water.

100 parts of a cleaned polyester fibre material are introduced into this bath at 50° C, the temperature is raised to 120° – 130° C over the course of half an hour and dyeing is carried out for one hour at this temperature with the vessel closed. The material is then rinsed thoroughly. A deep yellowish-tinged red dyeing of excellent fastness to light and to sublimation is obtained.

EXAMPLE 2

2.18 parts of 3-trichloromethyl-5-amino-1,2,4-thiadiazole are diazotised as in Example 1. The diazo solution is added to a solution of 2.63 parts of 2'-(N'-ethylanilino)-N-ethyl-pyridinium chloride in 50 parts of water at 0° to 5° C. The mixture is stirred for approx. one hour longer and is then rendered neutral to Congo Red by means of sodium acetate solution. After completion of coupling, the reaction mixture is evaporated in a rotary evaporator. The residue is dissolved in hot water and the solution is clarified by filtration. The filtrate is salted out. The dyestuff which has precipitated is filtered off, washed with 10% strength sodium chloride solution and dried. The resulting dyestuff, of the formula

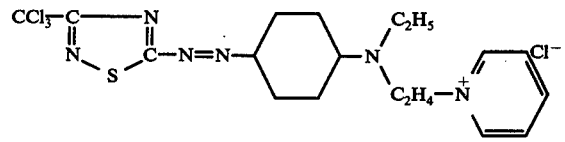

dyes polyacrylonitrile fibres in bluish-tinged red shades of excellent fastness properties.

Dyestuffs which dye acrylic fibres in the shade indicated in column II are obtained analogously by coupling diazotised 3-trichloromethyl-5-amino-1,2,4-thiadiazole with the coupling components indicated in column I.

| | I | II |
|---|---|---|
| 1 | ![structure with CH₂-cyclohexyl, C₂H₄N⁺-pyridinium-CH₃, cyclohexyl-N] CH₃SO₄⁻ | red |
| 2 | cyclohexyl-N(C₂H₄CN)(C₂H₄-N⁺(pyridinium)-CH₃) CH₃SO₄⁻ | bluish-tinged red |
| 3 | [3-hydroxy-5-methyl-pyrazole with N-CH₂CH₂-pyridinium-N-CH₃] I⁻ | red-yellow |
| 4 | [3-amino-5-methyl-pyrazole with N-C₂H₄N⁺-pyridinium] CH₃SO₃⁻ | orange |
| 5 | [6-hydroxy-4-methyl-3-cyano-pyridone with N-C₂H₄N⁺(CH₃)₂H] ½SO₄⁻ | red-yellow |

Dyestuffs which dye acrylic fibres in the shade indicated in column II are obtained analogously by coupling diazotised 3-cyano-5-amino-1,2,4-thiadiazole with the coupling components indicated in column I.

| | I | II |
|---|---|---|
| 1 | [3-methylcyclohexyl-N(C₂H₄-)(C₂H₄N⁺-pyridinium)] Cl⁻ | violet |
| 2 | [3-chlorocyclohexyl-N(C₂H₅)(C₂H₄N⁺(CH₃)₃)] Br⁺ | violet |
| 3 | [cyclohexyl-N(C₂H₄OCH₃)(C₂H₄N⁺(C₂H₅)₂H)] CH₃CO₂⁻ | bluish-tinged red |
| 4 | [3-hydroxy-5-methyl-pyrazole N-cyclohexyl-NHCOCH₂N⁺-pyridinium] Cl⁻ | red-yellow |
| 5 | [3-amino-5-methyl-pyrazole N-C₂H₄N⁺-pyridinium] CH₃SO₃⁻ | orange |

-continued

| | I | | II | |
|---|---|---|---|---|
| 6 | 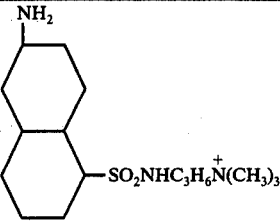 | | $CH_3SO_4^-$ | bluish-tinged red |
| 7 | 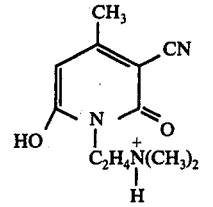 | | $\frac{1}{2} SO_4^-$ | red-yellow |

DYEING INSTRUCTION (POLYACRYLONITRILE)

1 part of the dyestuff obtained according to Example 2 is dissolved in 5,000 parts of water, with addition of 2 parts of 40% strength acetic acid. 100 parts of dried-off polyacrylonitrile staple fibre yarn are introduced into this dye bath at 60° C, the temperature is raised to 100° C over the course of half an hour and dyeing is carried out at the boil for one hour. The dyeing is then rinsed well and dried. A bluish-tinged red dyeing of very good fastness to light, to sublimation and washing is obtained.

What we claim is:

1. An azo dyestuff, free from sulphonic acid groups, of the formula

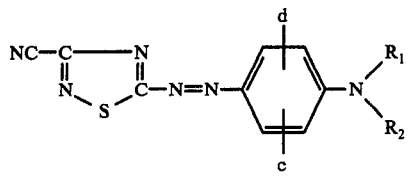

wherein $d$ and $c$ are independently hydrogen, chloro, bromo, lower alkyl, lower alkoxy, lower alkylmercapto, phenyl, phenoxy, phenylmercapto, cyclohexyl, cyclohexylmethyl, benzyl, methoxycarbonyl, ethoxycarbonyl, propoxycarbonyl; and $c$ is additionally trifluoromethyl or acylamino wherein the amino group is otherwise unsubstituted or substituted by methyl, and acyl is alkanoyl of up to 5 carbon atoms, alkylcarbamyl of up to 5 carbon atoms, alkoxycarbonyl of up to 5 carbon atoms, phenylcarbamyl, phenoxycarbonyl, benzoyl, phenoxyacetyl, chloroacetyl or phenylacetyl; and $R_1$ and $R_2$ are independently hydrogen or lower alkyl which is unsubstituted or substituted by: fluoro, chloro, bromo, phenyl, lower alkoxy, lower alkylcarbonyloxy, lower alkylcarbonylamino, benzoyloxy, benzoylamino (chloro-, bromo-, methyl-, ethyl-, methoxy- or ethoxy-) benzoylamino, cyano, hydroxy, phenoxy, phenylcarbonyl, phenylsulphonyloxy, phenoxycarbonyl, phenylthio, (chloro-, bromo-, methyl-, ethyl-, methoxy- or ethoxy) phenoxy, (chloro-, bromo-, methyl-, ethyl-, methoxy-, or ethoxy-) phenylcarbonyl, (chloro-, bromo-, methyl-, ethyl-, methoxy-, or ethoxy-) phenylsulphonyloxy, (chloro-, bromo-, methyl-, ethyl-, methoxy-, or ethoxy-) phenoxycarbonyl, (chloro-, bromo-, methyl-, ethyl-, methoxy-, or ethoxy-) phenylthio, lower alkylsulphonyl, lower alkoxycarbonyloxy, phenoxycarbonyloxy, phenylaminocarbonyloxy, aminocarbonyl, mono-lower alkylaminocarbonyl di-lower alkylaminocarbonyl, lower alkylcarbonyl, succinimido, phthalimido, lower alkoxycarbonyl cinnamoyl, thiophenecarbonyl, pyridinecarbonyl, phenoxyalkylcarbonyloxy, phenylaminoalkylcarbonyloxy or (lower alkoxy- or phenoxy-) carbonylalkylcarbonyl (-oxy or -amino).

2. An azo dye according to claim 1, of the formula

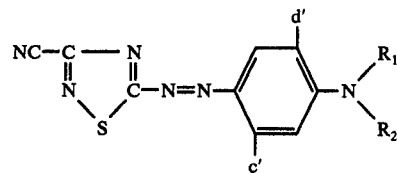

wherein $d'$ and $c'$ are independently hydrogen, chloro, methyl, ethyl, methoxy, ethoxy, phenylthio or phenylmercapto; and $c'$ additionally is trifluoromethyl or said acylamino.

3. An azo dyestuff, free from sulfonic acid groups, of the formula

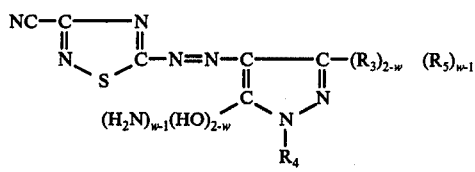

wherein $R_3$ is lower alkyl, lower alkoxy, phenyl, lower alkoxycarbonyl, aminocarbonyl or lower alkyl aminocarbonyl;

$R_4$ is hydrogen, lower alkyl, hydroxyethyl, phenyl or phenyl substituted by chloro, bromo, hydroxy, lower alkylcarbonylamino, benzoylamino, methyl, ethyl, propyl or butyl, or is sulpholanyl;

$R_5$ is hydrogen, lower alkyl, lower alkoxy, cyano, lower alkoxycarbonyl, carbamoyl, loweralkoxyloweralkoxycarbonyl, phenoxy or phenyl; and $w$ is 1 or 2.

4. An azo dyestuff, free from sulfonic acid groups of the formula

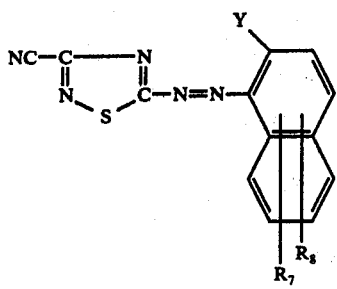
wherein
Y is —OH or —NHR$_6$.
$R_6$ is hydrogen, lower alkyl, benzyl or phenylethyl; and
$R_7$ and $R_8$ independently are hydrogen, halo, lower alkyl, lower alkoxy, nitro, sulphonylamino, N-lower alkyl sulphonylamino or N,N-dilower alkyl-sulphonylamino.
5. A dyestuff as claimed in claim 3 of the formula
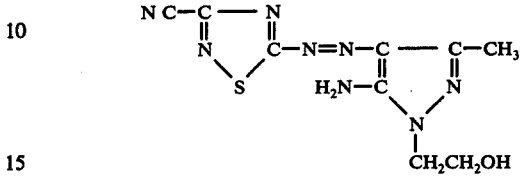
* * * * *